Aug. 19, 1930.    H. A. CALDERWOOD    1,773,572
ARMORED CABLE CLAMP
Filed Jan. 26, 1929

Hugh A. Calderwood
Inventor

By his Attorneys
Cooper, Kerr & Dunham

Patented Aug. 19, 1930

1,773,572

UNITED STATES PATENT OFFICE

HUGH A. CALDERWOOD, OF PITTSBURGH, PENNSYLVANIA, ASSIGNOR TO NATIONAL ELECTRIC PRODUCTS CORPORATION, OF NEW YORK, N. Y., A CORPORATION OF DELAWARE

ARMORED-CABLE CLAMP

Application filed January 26, 1929. Serial No. 335,203.

This invention relates to improvements in clamps for electrical outlets, switch boxes and the like. With such devices, it is the common practice to clamp armored cables in place in such boxes by suitable clamping means and as a protection for the insulated conductors within the armored cable, bushings are provided. Due to the disposition of such bushings and the clamping means which are disposed substantially over the ends of the cable, it has been heretofore difficult to inspect the boxes after installation to determine whether or not the bushings are present and if present whether or not they are properly placed.

The present invention has for its objects the provision of a clamping means provided with an inspection opening to permit inspection of the cable and of the bushing therein to determine the proper or improper placing of the bushing or complete absence of the pushing.

Figure 1:
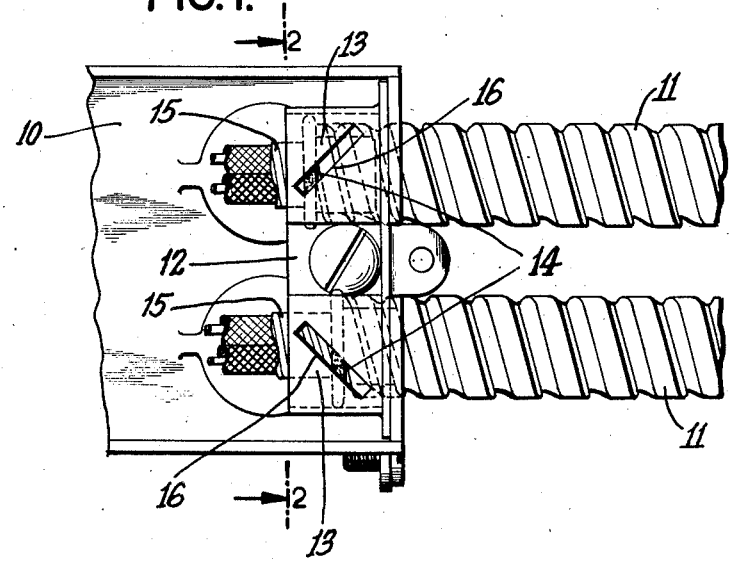
Figure 1 shows an outlet or switch box or the like provided with my improved clamp.
Figure 2:
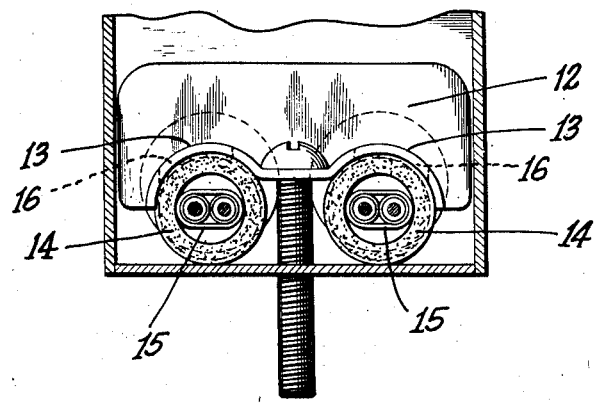
Fig. 2 is a detail view taken on line 2—2 of Fig. 1.

In the drawings 10 is a conventional outlet or switch box having the usual knockout openings to receive armored cables 11. Such cables are clamped in position by suitable clamping means such as an L-shaped plate 12 which has a portion 13 shaped to generally conform to the curvature of the cables. 14 are fibre bushings which are inserted within the armored cable to protect the insulated conductor 15 against cutting or abrasion from the end of the armor. Such bushings serve to prevent short circuits and are commonly termed "anti-short bushing". 16 represents inspection apertures in the part 13 of the clamp. Preferably but not necessarily, these apertures slope somewhat and extend back a considerable distance from the edge of the clamping plate so that such openings will overlie the bushing irrespective of position of the end of cable with respect to the clamping plate.

Such inspection apertures afford means to permit a wiring inspector to merely glance at the top of the clamp and determine whether the bushings are properly located or absent. Without such apertures being provided it might be necessary to wholly remove the clamp before inspection of the bushings could be made and even if such practice were followed the bushings might again become misplaced upon restoration of the clamp.

The inspection opening in the clamp also affords means to render visible the clamping relation of the clamp with respect to the cable itself. As shown in Fig. 1, the lower cable is inserted to a less depth in the box than the upper cable and improper assembling might cause the cable to be inserted to such an insufficient extent that the clamping would be uncertain. By providing the elongated inspection opening in the clamp the cable itself can be inspected to determine the extent of clamping engagement of the clamp.

It is obvious that the contour of the inspection opening could be varied as will be readily apparent. It is only necessary to suitably perforate the clamping part to afford the necessary visibility to the parts which are disposed below the clamp when it is in assembled relation in the box.

What I claim is:

1. An armored cable clamp for clamping to an outlet box or the like and in which the armored cable is provided with an insulating bushing, said clamp having an inspection opening therein to provide for the inspection of the bushing when the clamp is in assembled and clamping relation to the cable inserted in the box.

2. An outlet box or the like having a cable extending therein, said cable having an insulating bushing in its end and a clamp for holding the cable in place, said clamp having an inspection opening therein to render visible the bushing in the cable when the clamp is in assembled relation in the box.

3. An outlet box or the like having an armored cable extending thereinto and provided with an anti-short insulating bushing at its end, a clamping member for holding the cable in position, said clamp having an elongated inspection opening to render visible the assembly of bushing and cable which is disposed below the clamp.

4. A cable securing means with provision for securing thereto a cable which has an insulating bushing on its end, said securing means being provided with an inspection aperture extending through the material of the securing means and having all the edges of the aperture defined by the material of the securing means whereby the bushing may be inspected when the cable and bushing are in assembled relation in the cable securing means.

In testimony whereof I hereto affix my signature.

HUGH A. CALDERWOOD.